United States Patent
Leitao et al.

(10) Patent No.: US 10,635,605 B2
(45) Date of Patent: Apr. 28, 2020

(54) SHARED MEMORY INTER-ENCLAVE COMMUNICATION

(71) Applicant: International Business Machines Corporation, Armonk, NY (US)

(72) Inventors: Breno H. Leitao, Araraquara (BR); Mauro Sergio Martins Rodrigues, Campinas (BR); Rafael Camarda Silva Folco, Santa Barbara d'Oeste (BR); Daniel Battaiola Kreling, Hortolandia (BR)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 15/919,319

(22) Filed: Mar. 13, 2018

(65) Prior Publication Data
US 2019/0286577 A1 Sep. 19, 2019

(51) Int. Cl.
*H04L 9/30* (2006.01)
*G06F 12/14* (2006.01)
(Continued)

(52) U.S. Cl.
CPC ........ *G06F 12/1466* (2013.01); *G06F 9/5016* (2013.01); *G06F 12/1408* (2013.01);
(Continued)

(58) Field of Classification Search
CPC ............. G06F 12/1466; G06F 12/1408; G06F 21/6218; H04L 9/0861; H04L 9/0825
(Continued)

(56) References Cited

U.S. PATENT DOCUMENTS 7,895,296 B1 * 2/2011 Dayan ..................... G06F 21/53
709/217
8,074,229 B2 * 12/2011 Brunswig ............... G06F 9/455
719/312

(Continued)

FOREIGN PATENT DOCUMENTS

WO  2017/023434 A1  2/2017

OTHER PUBLICATIONS

Prerit Jain et al., "OpenSGX: An Open Platform for SGX Research", NDSS '16, Feb. 21-24, 2016, San Diego, CA, Copyright 2016 Internet Society, 16 pages.

(Continued)

*Primary Examiner* — Haresh N Patel
(74) *Attorney, Agent, or Firm* — Nicholas D. Bowman; Maxine L. Barasch; Keohane & D'Alessandro PLLC

(57) ABSTRACT

Disclosed embodiments provide techniques for inter-enclave communication through shared memory. Enclaves (containers) operate in a protected memory space that inhibits the use of shared memory. Disclosed embodiments enable enclaves to use shared memory, eliminating the communication bottlenecks associated with networking. A memory cryptography coprocessor implemented in hardware generates shared memory key data for a shared memory region that is to be used by two or more enclaves. The shared memory key data is sent to the enclaves that require a shared memory interface. The enclaves access the shared memory securely utilizing the shared memory key data. The memory cryptography coprocessor facilitates shared memory key generation and exchange. The memory cryptography coprocessor data is not directly accessible by the processes executing on the main processor. This enables secure cloud hosting on untrusted environments, since the hosting entity
(Continued)

cannot directly access the internal data of the memory cryptography coprocessor.

20 Claims, 7 Drawing Sheets

(51) Int. Cl.
  *G06F 21/79*  (2013.01)
  *G06F 21/62*  (2013.01)
  *H04L 9/08*  (2006.01)
  *G06F 9/50*  (2006.01)
  *G06F 9/455*  (2018.01)

(52) U.S. Cl.
  CPC ........ *G06F 21/6218* (2013.01); *H04L 9/0825* (2013.01); *H04L 9/0861* (2013.01); *G06F 9/45558* (2013.01)

(58) Field of Classification Search
  USPC .......................................................... 713/193
  See application file for complete search history.

(56) References Cited

U.S. PATENT DOCUMENTS

| | | | |
|---|---|---|---|
| 8,930,714 B2 | 1/2015 | Glew et al. | |
| 8,972,746 B2 | 3/2015 | Johnson et al. | |
| 9,009,858 B2 | 4/2015 | Sapp, II et al. | |
| 9,323,686 B2 | 4/2016 | McKeen et al. | |
| 10,009,251 B1* | 6/2018 | Koster .................. | H04L 67/141 |
| 10,362,110 B1* | 7/2019 | Matylitski ............ | H04L 67/1097 |
| 10,425,313 B2* | 9/2019 | Koster .................... | H04L 47/11 |
| 2012/0198538 A1 | 8/2012 | Spring et al. | |
| 2015/0006487 A1* | 1/2015 | Yang ....................... | G06F 9/461 |
| | | | 707/649 |
| 2015/0186295 A1 | 7/2015 | Savagaonkar et al. | |
| 2015/0331681 A1* | 11/2015 | Rose ....................... | G06F 8/437 |
| | | | 717/143 |
| 2016/0171248 A1 | 6/2016 | Nesher et al. | |
| 2016/0239011 A1* | 8/2016 | Lo .......................... | G05B 19/05 |
| 2016/0246720 A1 | 8/2016 | Pandey et al. | |
| 2016/0283404 A1 | 9/2016 | Xing et al. | |
| 2016/0283411 A1 | 9/2016 | Sheller et al. | |
| 2018/0075103 A1* | 3/2018 | Kogan .............. | G06F 17/30424 |
| 2018/0203870 A1* | 7/2018 | Narayanasamy ....... | G06F 16/13 |
| 2018/0218007 A1* | 8/2018 | Wells ..................... | H04L 67/06 |
| 2018/0336079 A1* | 11/2018 | Soman ................ | G06F 9/45504 |
| 2019/0370050 A1* | 12/2019 | Kumar ................ | G06F 12/1063 |

OTHER PUBLICATIONS

Uday Savagaonkar, "Memory enclaves with software configuration information", Jan. 30, 2017, 11 pages.
David Kaplan et al., "AMD Memory Encryption", http://amd-dev.wpengine.netdna-cdn.com/wordpress/media/2013/12/AMD_Memory_Encryption_Whitepaper_v7-Public.pdf, Apr. 21, 2016, 12 pages.
Simon Johnson, "The Intel SGX Memory Encryption Engine", https://software.intel.com/en-us/blogs/2016/02/26/memory-encryption-an-intel-sgx-underpinning-technology, Published Feb. 26, 2016, 3 pages.
ComputerWeekly.com, "Hypervisor security: New Techniques for securing virtual machines", http://www.computerweekly.com/feature/Hypervisor-security-New-techniques-for-securing-virtual-machines, Copyright 2000-2018, TechTarget, 6 pages.
"OpenPower I/O Design Architecture", Version 2, Workgroup Specification, Revision 1.0.0, Feb. 17, 2016, 70 pgs.
Dewan, Prashant et al., "A Hypervisor-Based System for Protecting Software Runtime Memory and Persistent Storage", 2008 SpringSim, 8 pgs.
Appendix P, "List of IBM Patents or Patent Applications Treated as Related", Mar. 13, 2018, 2 pages.

* cited by examiner

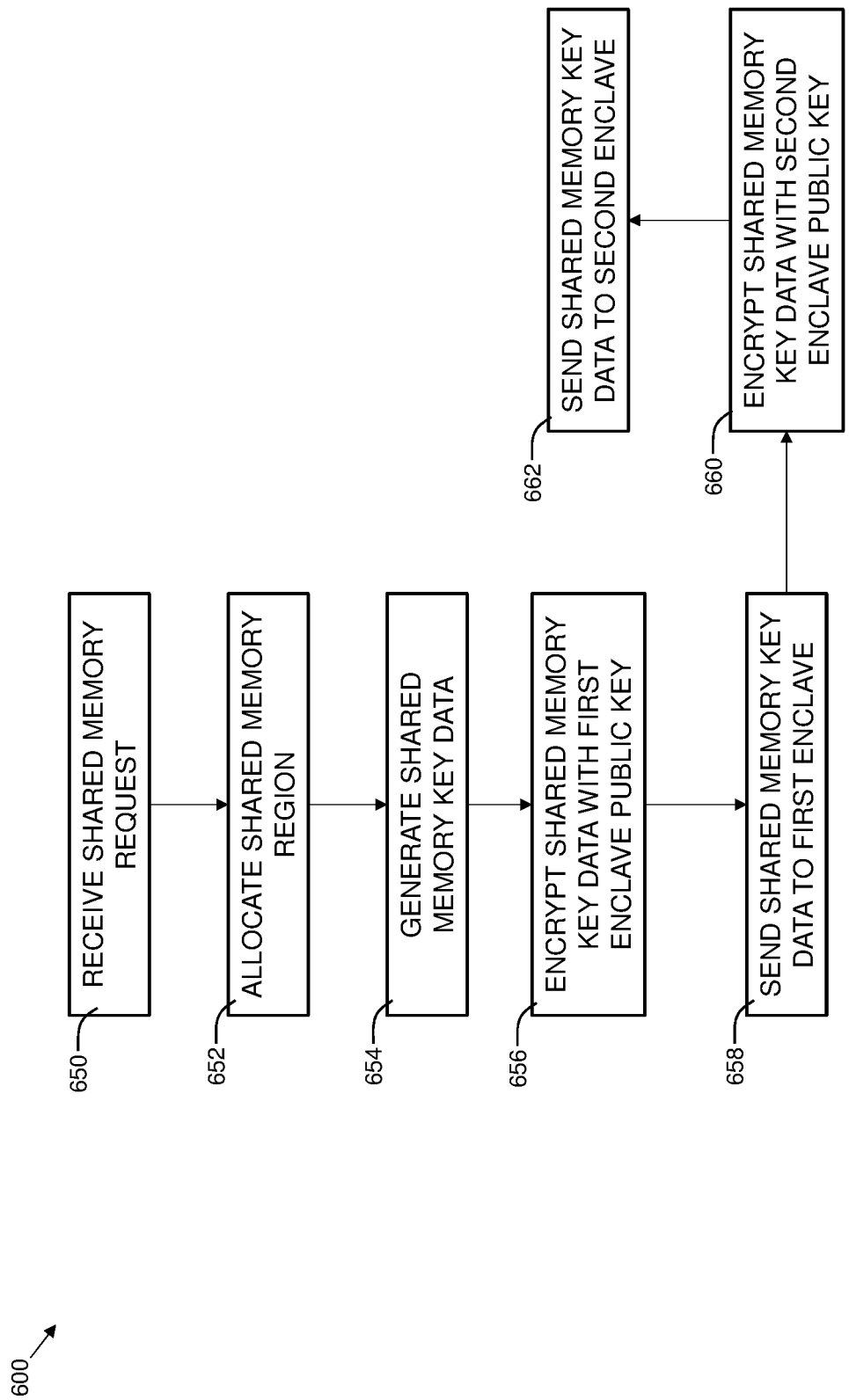

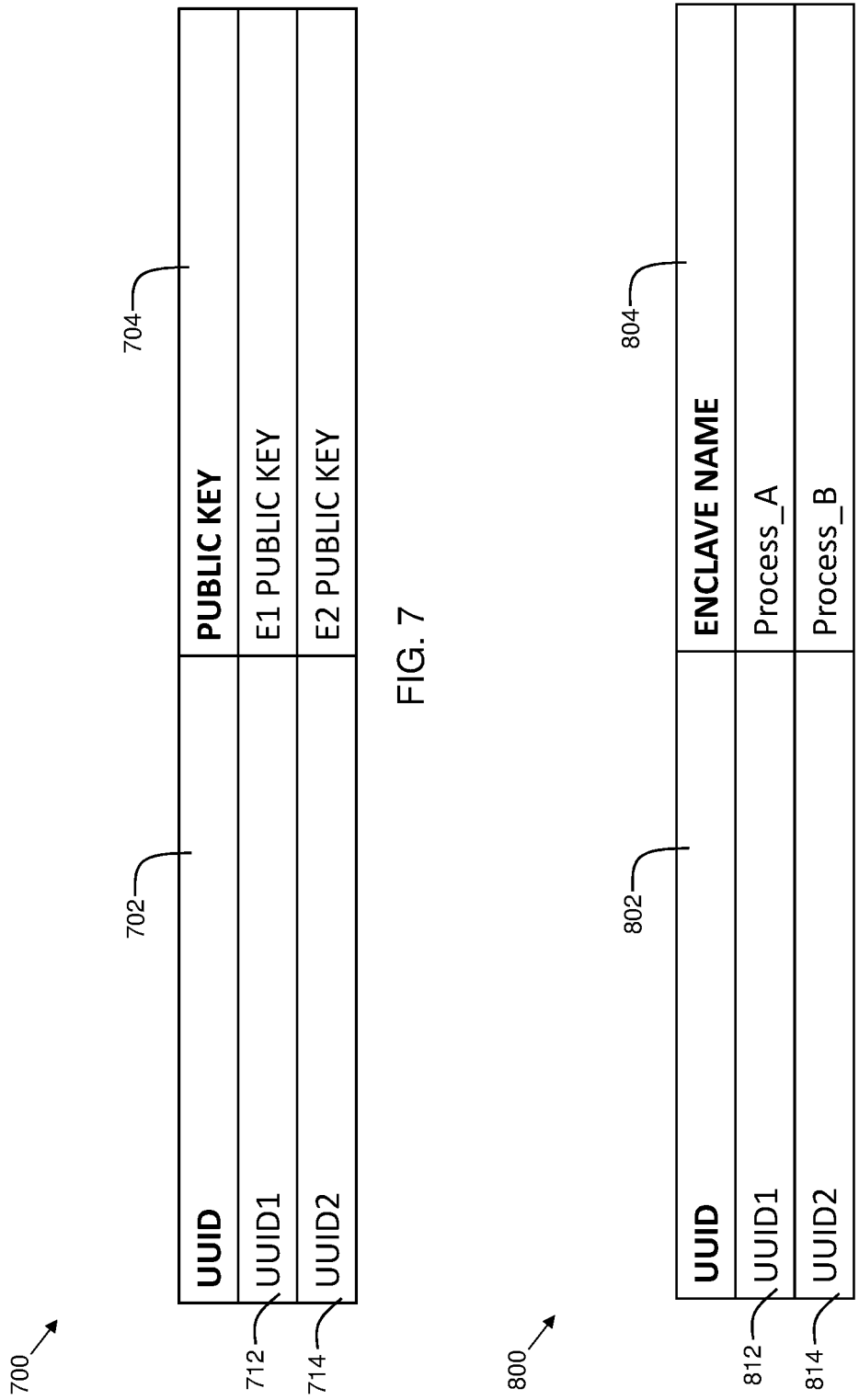

SHARED MEMORY INTER-ENCLAVE COMMUNICATION

FIELD OF THE INVENTION

The present invention relates generally to computer architecture, and more particularly, to shared memory inter-enclave communication.

BACKGROUND

Virtual machines have been used for hosting cloud-based applications. Recently, containerization has been increasingly used in place of virtual machines due to various advantages. Using containers, or enclaves, it is possible to host more applications within a single physical server than when using a virtual machine. Virtual machines use a large amount of system resources, since each virtual machine (VM) runs a full copy of an operating system, along with a virtual copy of all the hardware that the operating system executes on. This consumes considerable computing resources on the host machine. Thus, the use of containers, or enclaves, is becoming increasingly important in hosting applications, as they can be more efficient than VMs. It is therefore desirable to have improvements in containerization to enable increased computer application performance.

SUMMARY

In one embodiment, there is provided a computer-implemented method for inter-enclave communication, comprising: receiving a shared memory request for establishing a shared memory region between a plurality of enclaves including at least a first enclave and a second enclave; in response to receiving the shared memory request, allocating the shared memory region; generating shared memory key data for the shared memory region; encrypting the shared memory key data with a first public key corresponding to a first private key stored in the first enclave; encrypting the shared memory key data with a second public key corresponding to a second private key stored in the second enclave; sending the shared memory key data encrypted with the first public key to the first enclave; and sending the shared memory key data encrypted with the second public key to the second enclave.

In another embodiment, there is provided an electronic computation device comprising: a processor; a first memory coupled to the processor, the first memory comprising a first enclave and a second enclave; a memory cryptography coprocessor coupled to the processor; a second memory coupled to the memory cryptography coprocessor, the second memory containing instructions, that when executed by the memory cryptography coprocessor, perform the steps of: receiving a shared memory request for establishing a shared memory region between the first enclave and the second enclave; in response to receiving the shared memory request, allocating the shared memory region; generating shared memory key data for the shared memory region; encrypting the shared memory key data with a first public key corresponding to a first private key stored in the first enclave; encrypting the shared memory key data with a second public key corresponding to a second private key stored in the second enclave; sending the shared memory key data encrypted with the first public key to the first enclave; and sending the shared memory key data encrypted with the second public key to the second enclave.

In yet another embodiment, there is provided a computer program product for an electronic computation device comprising a computer readable storage medium having program instructions embodied therewith, the program instructions executable by a processor to cause the electronic computation device to: receive a shared memory request for establishing a shared memory region between a plurality of enclaves including at least a first enclave and a second enclave; in response to receiving the shared memory request, allocate the shared memory region; generate shared memory key data for the shared memory region; encrypt the shared memory key data with a first public key corresponding to a first private key stored in the first enclave; encrypt the shared memory key data with a second public key corresponding to a second private key stored in the second enclave; send the shared memory key data encrypted with the first public key to the first enclave; and send the shared memory key data encrypted with the second public key to the second enclave.

BRIEF DESCRIPTION OF THE DRAWINGS

Features of the disclosed embodiments will be more readily understood from the following detailed description of the various aspects of the invention taken in conjunction with the accompanying drawings.

FIG. 6 is a flowchart indicating process steps for embodiments of the present invention.

FIG. 7 shows an exemplary public key table.

FIG. 8 shows an exemplary enclave information table.

Figure 1:
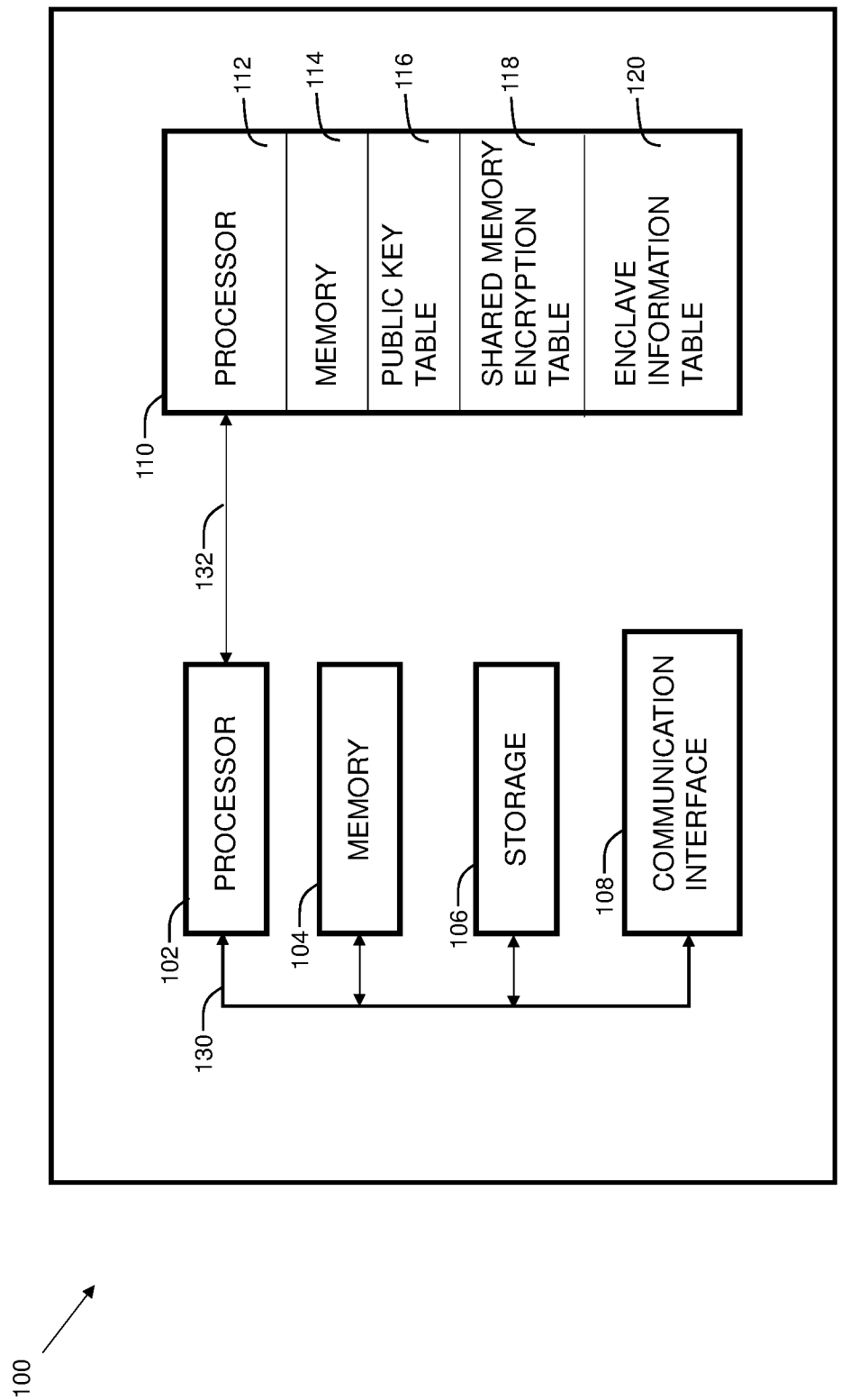
FIG. 1 is a block diagram of an electronic computation device in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for inter-enclave communication through shared memory. Enclaves (containers) operate in a protected memory space that inhibits sharing of data through shared memory. Typically, to share data, processes in enclaves utilize network protocols. While this is effective, it involves significant overhead of going through network stacks, thereby degrading performance. Disclosed embodiments enable enclaves to use shared memory, eliminating the communication bottlenecks associated with networking. A memory cryptography coprocessor implemented in hardware generates shared memory key data for a shared memory region that is to be used by two or more enclaves. The shared memory key data is sent to the enclaves that require a shared memory interface. The enclaves access the shared memory securely utilizing the shared memory key data. The memory cryptography coprocessor facilitates shared memory key generation and exchange. The memory cryptography coprocessor data is not directly accessible by the user or kernel processes executing on the main processor. This enables secure cloud hosting on untrusted environments, since the hosting entity cannot access the internal data of the memory cryptography coprocessor.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 is a block diagram of an electronic computation device 100 in accordance with embodiments of the present invention. Device 100 includes a processor 102, and memory 104 coupled to the processor 102. Processor 102 may be referred to as a host processor. Memory 104 may include dynamic random-access memory (DRAM), static random-access memory (SRAM), magnetic storage, and/or a read only memory such as flash, EEPROM, optical storage, or other suitable memory. In some embodiments, the memory 104 may not be a transitory signal per se. Memory 104 stores instructions, which when executed by the processor 102, implement steps of embodiments of the present invention.

Device 100 further includes storage 106. Storage 106 may include, but is not limited to, multiple magnetic hard disk drives, solid state disk drives, or other suitable storage device(s). In some embodiments, the storage may be configured in a RAID configuration. In embodiments, the RAID configuration can include a RAID 1 configuration in which data is copied seamlessly and simultaneously, from one disk to another, creating a replica, or mirror. If one hard disk drive becomes inoperable, another hard disk drive continues to operate, providing a level of fault tolerance.

In other embodiments, the RAID configuration can include a RAID 5 configuration in which data and parity are striped across three or more disks. If one hard disk drive within the array gets an error or starts to fail, data is recreated from this distributed data and parity block, seamlessly and automatically. This allows disclosed embodiments to remain operational even when one hard disk drive fails. Other redundancy schemes are possible with disclosed embodiments.

Device 100 further includes communication interface 108. Communication interface 108 may include one or more wired and/or optical ports for network communication, including, but not limited to, Ethernet and/or Gigabit Ethernet. The communication interface 108 may further include a wireless communication interface that includes modulators, demodulators, and/or antennas for a variety of wireless protocols including, but not limited to, Wi-Fi and/or cellular communication protocols for communication over a computer network. The processor 102, memory 104, storage 106, and communication interface 108 may communicate via a main shared communication bus 130. The communication bus 130 can include I2C, SPI, or other suitable communication mechanism.

Device 100 further includes a memory cryptography coprocessor module 110. The memory cryptography coprocessor module 110 includes processor 112, and memory 114 coupled to processor 112. Memory 114 may include dynamic random-access memory (DRAM), static random-access memory (SRAM), magnetic storage, and/or a read only memory such as flash, EEPROM, optical storage, or other suitable memory. In some embodiments, the memory 114 may not be a transitory signal per se. Memory 114 stores instructions, which when executed by the processor 112, implement steps of embodiments of the present invention. Within the memory 114, various encryption information may be stored. The encryption information can include, but is not limited to, public key table 116, and shared memory encryption table 118.

The memory cryptography coprocessor (MCC) module 110 may be configured to communicate with main processor 102 via dedicated communication bus 132. The communication bus 132 can include I2C, SPI, or other suitable communication mechanism. In embodiments, the processor 102 is prevented from direct access to memory 114, public key table 116, and shared memory encryption table 118. An application programming interface (API) layer may be used to facilitate generation and/or distribution of keys and other encryption information. In this way, a process executing on the main processor 102 can invoke an API call by sending a message to processor 112 via communication bus 132. The message causes the processor 112 of the MCC module 110 to disseminate the encryption information accordingly.

Device 100 may be used to host virtual machines and/or containerized processes. Within this disclosure, containerized processes may be referred simply as containers, or enclaves, and provide operating system level virtualization, rather than the hardware level virtualization of a traditional virtual machine. A hypervisor within device 100 may be configured to create and manage virtual machines and/or enclaves. Information pertaining to each enclave, including, but not limited to, a universally unique identifier (UUID), and/or enclave name may be stored in enclave information table 120.

These enclaves are isolated from each other and have their own file systems. Furthermore, an enclave does not have direct exposure to the processes or data of other enclaves. This provides enhanced robustness and security, since a faulty program in one enclave cannot corrupt memory of another enclave.

In cloud-based hosting, as well as traditional hosting, multiple containers may work together in a group to perform a task. As an example, a cloud-based service may involve a web server, a database, and a data processing component. Each component may be implemented in an individual container, yet working together to provide an overall functionality. The secure nature of enclaves has impeded data sharing between the components. Disclosed embodiments enable a shared memory approach for enclaves that maintains the desirable secure aspects of enclaves, while removing communication throughput limitations associated with network stacks.

Figure 2:
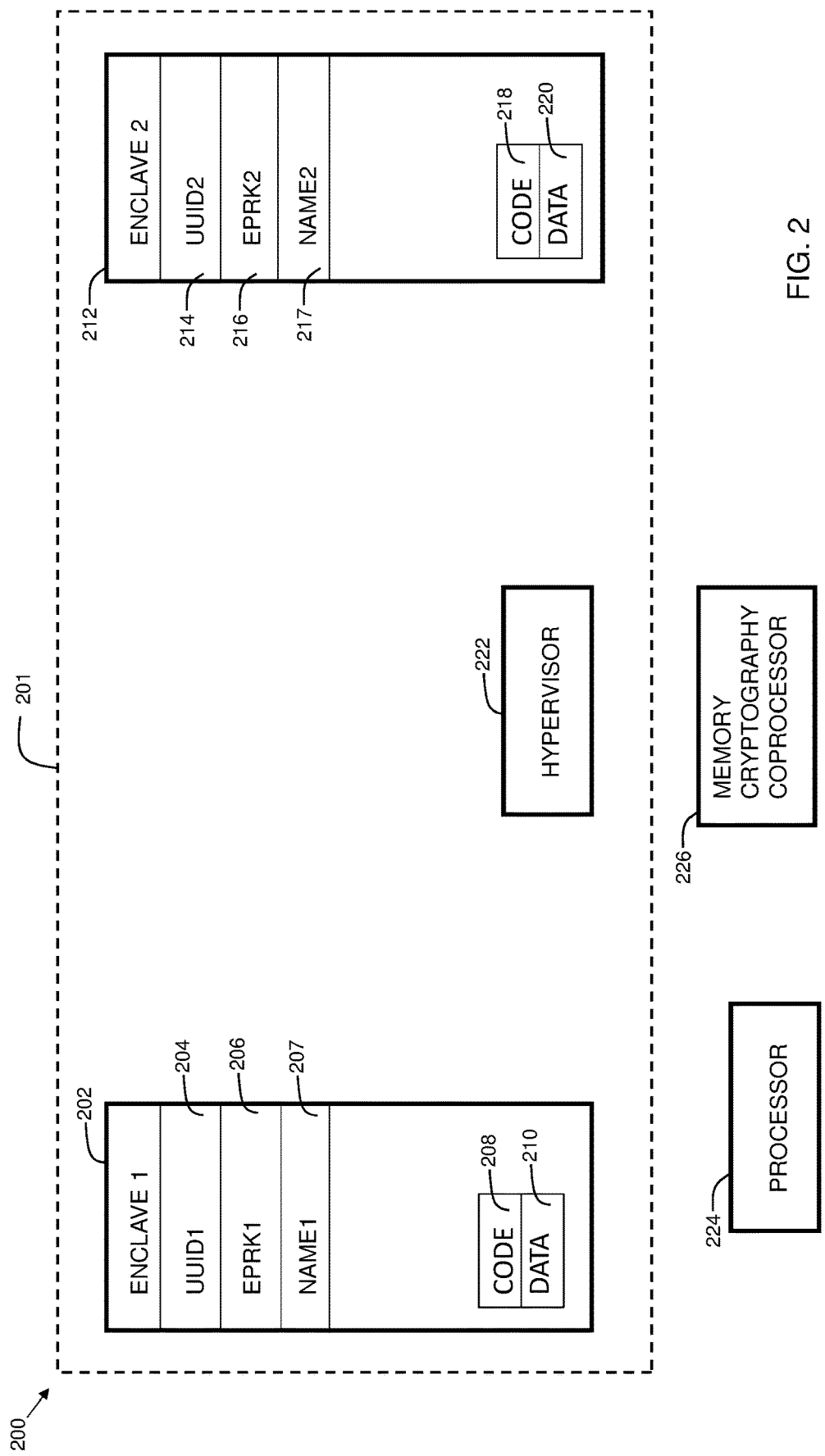
FIG. 2 shows an example of two enclaves prior to allocation of shared memory.

FIG. 2 shows an example block diagram 200 of two enclaves prior to allocation of shared memory. Host processor 224 may be similar to processor 102 of FIG. 1. Memory cryptography coprocessor module (MCC) 226 may be similar to memory cryptography coprocessor module 110 of FIG. 1. Processor 224 and MCC 226 comprise a hardware layer. The entities within box 201 represent entities implemented in software. In embodiments, hypervisor 222 may include Kernel Based Virtual Machine (KVM), VirtualBox, Xen Cloud Platform (XCP), LXC, OpenVZ, or other suitable hypervisor. In other embodiments, the hypervisor may be implemented in hardware (i.e., type 1 hypervisor).

Referring now to enclave 202 (also referred to as "Enclave 1"), the enclave comprises a region of memory within the memory of the host machine (e.g., memory 104 of FIG. 1). Enclave 202 includes a universally unique identifier (UUID) 204, an enclave private key 206, and an enclave name 207. Additionally, enclave 202 contains a section of code 208 for execution on processor 102 (FIG. 1), and data 210, which the code 208 may use as input and/or create as output.

Similarly, enclave 212 (also referred to as "Enclave 2") includes a universally unique identifier (UUID) 214, an enclave private key 216, and an enclave name 217. Additionally, enclave 212 contains a section of code 218 for execution on processor 102 (FIG. 1), and data 220, which the code 218 may use as input and/or create as output. In some embodiments, the UUID for an enclave may be based on its absolute memory address, or other unique identifier.

During creation/initialization of the enclave, the hypervisor 222 executing on processor 224 instructs the MCC module 226 to generate a keypair, providing the private key to the enclave, and storing the corresponding public key in the public key table (116 of FIG. 1).

Data written to the enclave during initialization/creation by the hypervisor is encrypted by the MCC module 110 using the corresponding public key. For each enclave, its corresponding private key (206 and 216) allow it to decrypt data that is sent to it. In embodiments, the enclave keypair is generated and disseminated by the MCC module 226. Thus, the host processor 224 does not have direct access to the enclave keypair, and the contents of the enclave are encrypted such that only the enclave can decrypt it with the corresponding private key.

Figure 3:
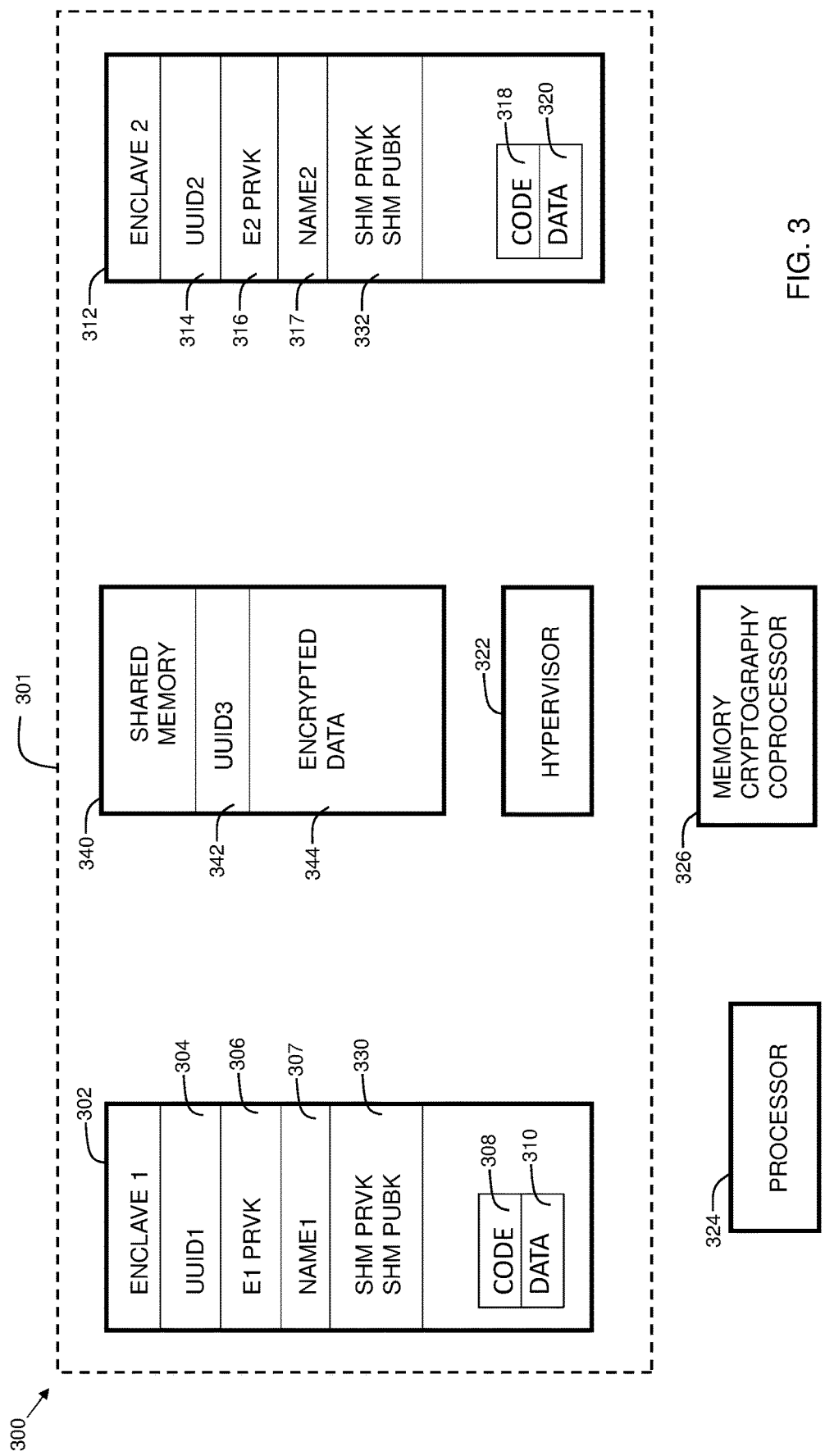
FIG. 3 shows an example of inter-enclave shared memory in accordance with embodiments of the present invention.

FIG. 3 shows an example diagram 300 of inter-enclave shared memory in accordance with embodiments of the present invention. For the purpose of illustration, it can be assumed that enclave 302 and enclave 312 need to share data. Processor 324 and MCC 326 comprise a hardware layer. The entities within box 301 represent entities implemented in software.

Referring now to enclave 302 (also referred to as "Enclave 1"), the enclave comprises a region of memory within the memory of the host machine (e.g., memory 104 of FIG. 1). Enclave 302 includes a universally unique identifier (UUID) 304, an enclave private key 306, and an enclave name 307. Additionally, enclave 302 contains a section of code 308 for execution on processor 102 (FIG. 1), and data 310, which the code 308 may use as input and/or create as output.

Similarly, enclave 312 (also referred to as "Enclave 2") includes a universally unique identifier (UUID) 314, an enclave private key 316, and an enclave name 317. Additionally, enclave 312 contains a section of code 318 for execution on processor 102 (FIG. 1), and data 320, which the code 318 may use as input and/or create as output.

In embodiments, an enclave (e.g., enclave 302) may issue a shared memory request to the hypervisor 322. The shared memory requests may include the name of the other enclave(s) it needs to establish sharing with. The hypervisor 322 may then pass the request, including the names of the enclaves to the MCC module 326. The MCC module 326 may then retrieve the UUID of each enclave from the enclave information table (120 of FIG. 1), and allocate a shared memory region 340 and generate shared memory key data. The shared memory region 340 may also include a UUID 342, which can be used as a seed for key data generation. In embodiments, allocating a shared memory region comprises creating a third enclave. In embodiments, the shared memory key data includes a shared memory private key (SHM PRVK) and a shared memory public key (SHM PUBK). Thus, in embodiments, generating shared memory key data comprises generating an asymmetric encryption keypair comprising a shared memory public key and a shared memory private key. The MCC module 326 provides the shared memory key data to both enclave 302 and enclave 312. In this embodiment, enclave 1 shared memory key data 330 is the same as shared memory key data 332. Thus, in embodiments, sending shared memory key data comprises sending the shared memory public key and the shared memory private key to the first enclave and the second enclave. The actual data values for the shared memory key data stored in each enclave may be different, since the shared memory key data is specifically encrypted for each enclave using that enclave's public key.

When enclave 302 writes data to the encrypted data section 344 of shared memory region 340, enclave 302 first encrypts the data using the shared memory public key (SHM PUBK). When enclave 302 retrieves data from shared memory region 340, it then decrypts it with the shared memory private key (SHM PRVK). Enclave 312 operates in a similar manner. In this way, both enclave 302 and enclave 312 can securely utilize shared data for communication, improving performance over network stack-based solutions, due to the reduced overhead.

In embodiments, allocating a shared memory region comprises allocating a non-enclave memory region. For example, the shared memory region can simply be a region allocated in host memory. The data written to the shared memory region is encrypted using the shared memory key data, maintaining a degree of security.

Embodiments can include computing a checksum for the shared memory key data. In those embodiments, the checksum may be transmitted to each enclave along with the shared memory key data. The enclaves can locally compute the checksum of the shared memory key data and compare it to the checksum transmitted by the MCC module 326. If the checksums do not match, the enclave can request that the MCC module 326 retransmit the shared memory key data. This embodiment adds a layer of robustness to the shared memory mechanism of disclosed embodiments. In some embodiments, the checksum may be an MD5 checksum.

Figure 4:
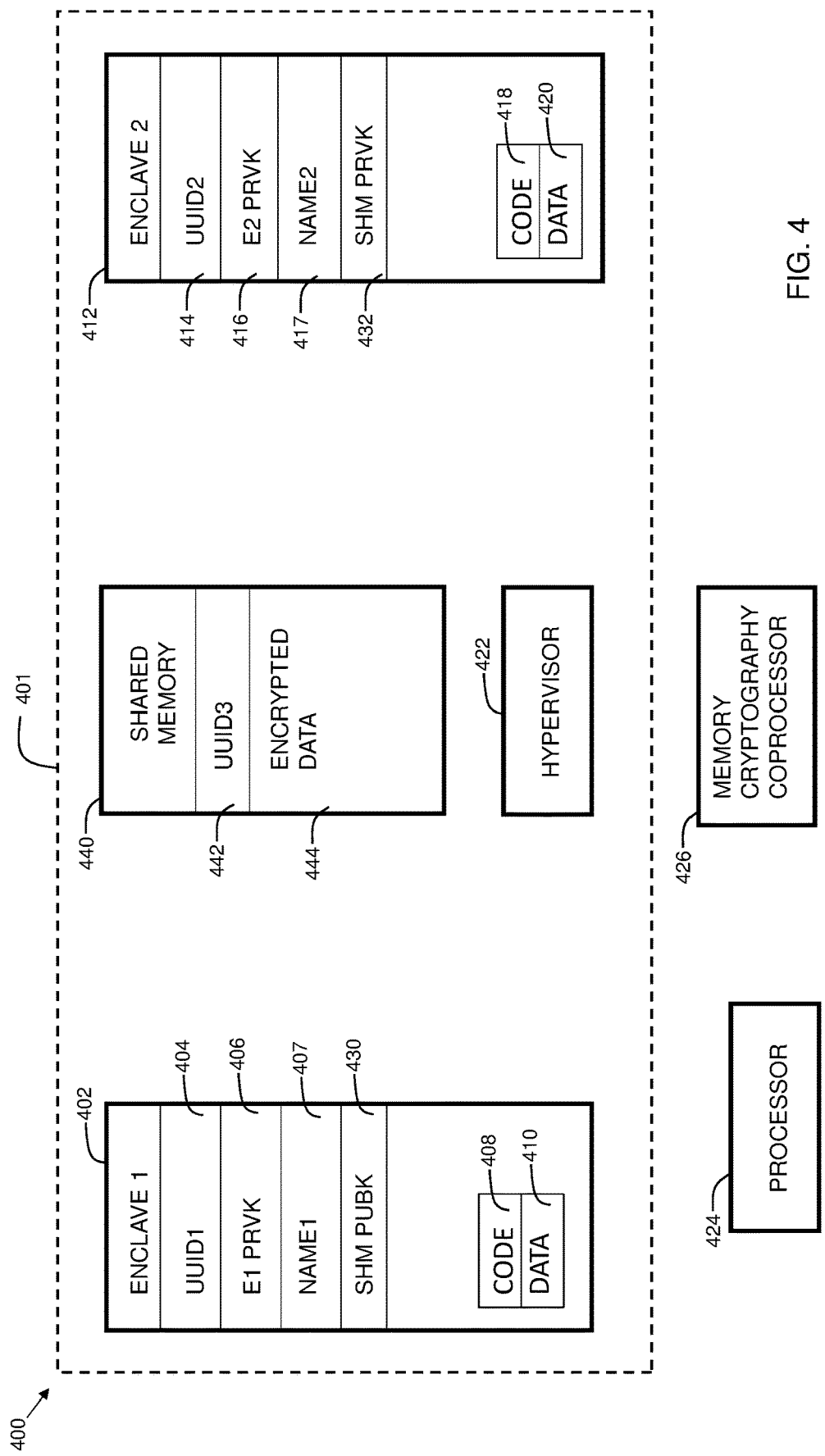
FIG. 4 shows an example of inter-enclave shared memory in accordance with additional embodiments of the present invention.

FIG. 4 shows an example diagram 400 of inter-enclave shared memory in accordance with additional embodiments of the present invention. For the purpose of illustration, it can be assumed that enclave 402 and enclave 412 need to share data. Processor 424 and MCC 426 comprise a hardware layer. The entities within box 401 represent entities implemented in software.

Referring now to enclave 402 (also referred to as "Enclave 1"), the enclave comprises a region of memory within the memory of the host machine (e.g., memory 104 of FIG. 1). Enclave 402 includes a universally unique identifier (UUID) 404, an enclave private key 406, and an enclave name 407. Additionally, enclave 402 contains a section of code 408 for execution on processor 102 (FIG. 1), and data 410, which the code 408 may use as input and/or create as output.

Similarly, enclave 412 (also referred to as "Enclave 2") includes a universally unique identifier (UUID) 414, an enclave private key 416, and an enclave name 417. Additionally, enclave 412 contains a section of code 418 for execution on processor 102 (FIG. 1), and data 420, which the code 418 may use as input and/or create as output.

In embodiments, an enclave (e.g., enclave 402) may issue a shared memory request to the hypervisor 422. The shared memory requests may include the name of the other enclave(s) it needs to establish sharing with. The hypervisor 422 may then pass the request, including the names of the enclaves to the MCC module 426. The MCC module 426 may then retrieve the UUID of each enclave from the enclave information table (120 of FIG. 1), and allocate a shared memory region 440 and generate shared memory key data. The shared memory region 440 may also include a UUID 442, which can be used as a seed for key data generation. In embodiments, sending shared memory key data comprises sending the shared memory public key to the first enclave and sending the shared memory private key to the second enclave. Thus, in this embodiment, the shared memory public key (SHM PUBK) is sent to enclave 402 and stored in shared memory key register 430. Similarly, the shared memory private key (SHM PRVK) is sent to enclave 402 and stored in shared memory key register 432. This embodiment can be utilized for unidirectional shared memory communication. As shown in FIG. 4, enclave 402 encrypts data with the shared memory public key (SHM PUBK) in register 430, and then writes it into encrypted data region 444. Enclave 412 reads encrypted data region 444 and then decrypts it with shared memory private key (SHM PRVK) stored in register 432. Thus, unidirectional communication is established from enclave 402 to enclave 412. This embodiment can provide increased security over the embodiment of FIG. 3 for instances where only unidirectional communication is required, since each enclave only has the key it needs for its intended operation (reading or writing).

In embodiments, the asymmetric encryption algorithm can include, but is not limited to, Rivest Shamir Adleman (RSA), Elliptic Curve Cryptography (ECC), El Gamal, and/or Digital Signature Algorithm (DSA). Other suitable asymmetric encryption algorithms may be used.

Figure 5:
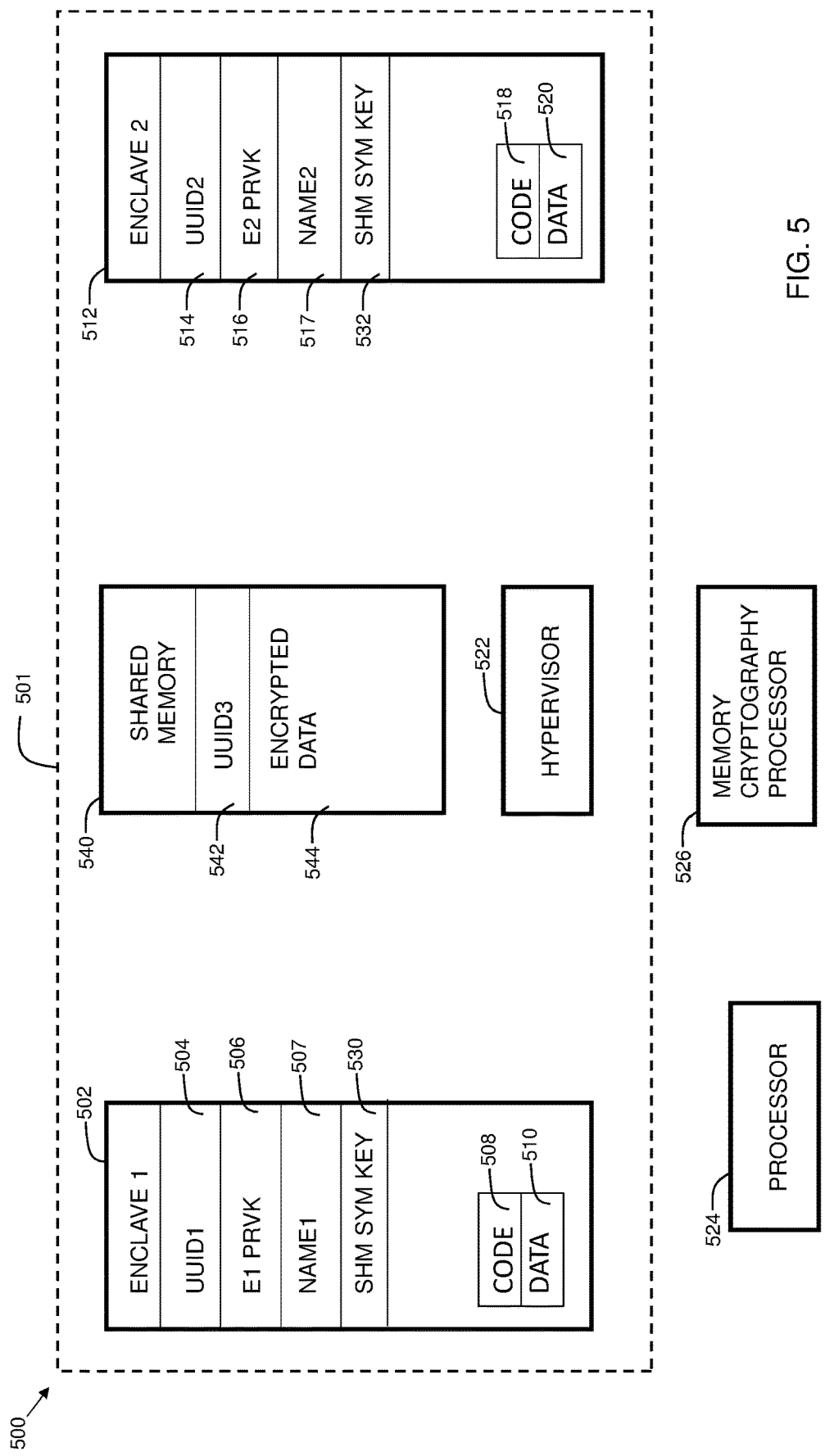
FIG. 5 shows an example of inter-enclave shared memory in accordance with additional embodiments of the present invention.

FIG. 5 shows an example diagram 500 of inter-enclave shared memory in accordance with additional embodiments of the present invention. For the purpose of illustration, it can be assumed that enclave 502 and enclave 512 need to share data. Processor 524 and MCC 526 comprise a hardware layer. The entities within box 501 represent entities implemented in software.

Referring now to enclave 502 (also referred to as "Enclave 1"), the enclave comprises a region of memory within the memory of the host machine (e.g., memory 104 of FIG. 1). Enclave 502 includes a universally unique identifier (UUID) 504, an enclave private key 506, and an enclave name 507. Additionally, enclave 502 contains a section of code 508 for execution on processor 102 (FIG. 1), and data 510, which the code 508 may use as input and/or create as output.

Similarly, enclave 512 (also referred to as "Enclave 2") includes a universally unique identifier (UUID) 514, an enclave private key 516, and an enclave name 517. Additionally, enclave 512 contains a section of code 518 for execution on processor 102 (FIG. 1), and data 520, which the code 518 may use as input and/or create as output.

In embodiments, an enclave (e.g. enclave 502) may issue a shared memory request to the hypervisor 522. The shared memory requests may include the name of the other enclave(s) it needs to establish sharing with. The hypervisor 522 may then pass the request, including the names of the enclaves to the MCC module 526. The MCC module 526 may then retrieve the UUID of each enclave from the enclave information table (120 of FIG. 1), and allocate a shared memory region 540 and generate shared memory key data. The shared memory region 540 may also include a UUID 542, which can be used as a seed for key data generation. In embodiments, generating shared memory key data comprises generating a symmetric encryption key. Thus, in this embodiment, a shared symmetric key (SHM SYM KEY) is sent from the MCC module 526 to enclave 502, where it is stored in register 530. Similarly, the same shared symmetric key (SHM SYM KEY) is sent from the MCC module 526 to enclave 512, where it is stored in register 532. Thus, this embodiment provides bidirectional communication between enclaves like the embodiment of FIG. 3. However, in the embodiment of FIG. 5, a symmetric key is used, which can increase performance, since symmetric encryption algorithms are generally faster than asymmetric encryption algorithms. Thus, both enclave 502 and enclave 512 use the same key (SHM SYM KEY) for reading and writing of encrypted data section 544 of shared memory region 540. In embodiments, the symmetric encryption algorithm may include 3DES, RSA, Blowfish, AES, or other suitable symmetric encryption algorithm. The shared memory key data may be stored in the shared memory encryption table (118 of FIG. 1). When an enclave requires use of a shared memory region, the shared memory key data from the shared memory encryption table is encrypted with the public key for that enclave and then sent to that enclave in its encrypted form.

FIG. 6 is a flowchart 600 indicating process steps for embodiments of the present invention. In process step 650, a shared memory request is received. This can originate from code executing within an enclave, such as indicated as 208 in FIG. 2. Alternatively, the request can originate from a hypervisor such as 222 of FIG. 2. In process step 652, a shared memory region is allocated for the shared memory request. This can include creating an additional enclave. This enclave may or may not contain executable code. In some embodiments, the shared memory region may be a region allocated in global memory space. In some embodiments, a Linux mmap call may be used to designate a memory region as shared memory for inter-enclave communication. In process step 654, shared memory key data is generated. This can include generating a keypair for asymmetric encryption, or a single key for symmetric encryption. In process step 656, the shared memory data is encrypted with the first enclave public key. Thus, the shared memory key data is encrypted in a manner that it can only be decrypted by the first enclave using its private key. In process step 658, the encrypted shared memory key data is sent to the first enclave. In process step 660, the shared memory data is encrypted with the second enclave public key. Thus, the shared memory key data is encrypted in a manner that it can only be decrypted by the second enclave using its private key. In process step 662, the encrypted shared memory key data is sent to the second enclave. Note that this flowchart depicts a possible implementation, but other implementations are possible. In some implementations, one or more steps may be performed in a different order, or performed concurrently.

FIG. 7 shows an exemplary public key table 700, similar to public key table 116 of FIG. 1. Column 702 contains UUIDs for enclaves in use. Column 704 contains public keys for each enclave. Row 712 contains the UUID and public key corresponding to enclave 1 (e.g., 302 of FIG. 3). Row 714 contains the UUID and public key corresponding to enclave 2 (e.g., 312 of FIG. 3). Note that while only two rows are shown in public key table 700, in practice, there can be more than two rows. When the MCC module sends data to an enclave, it first encrypts the data with the corresponding public key from the public key table. In this way, data residing memory used by an enclave is only readable by that enclave, using the private key of that enclave (e.g., 306 of FIG. 3 for enclave 302, or 316 of FIG. 3, for enclave 312). This maintains security, while still enabling the benefits of shared memory for improved performance.

FIG. 8 shows an exemplary enclave information table 800, similar to enclave information table 120 of FIG. 1. Column 802 contains UUIDs for enclaves in use. Column 804 contains an enclave name for each enclave. Row 812 contains the UUID and enclave name (Process_A) corresponding to enclave 1 (e.g., 302 of FIG. 3). Row 814 contains the UUID and enclave name (Process_B) corresponding to enclave 2 (e.g. 312 of FIG. 3). Note that while only two rows are shown in enclave information table 800, in practice, there can be more than two rows. When the MCC module processes an enclave shared memory request, it retrieves the UUID from the enclave information table 800 that corresponds to the requested enclave name. In this way, an enclave can request to share data with another enclave by specifying the name of the enclave, and the UUID for that enclave can be retrieved. The UUID of the enclaves that are to share memory can be used as the seed for shared memory key data. In some embodiments, the UUID of the enclaves may be combined with a nonce prior to generation of the shared memory key data.

As can now be appreciated, disclosed embodiments provide improvements to the technical field of inter-enclave communication. Multiple enclaves often work in conjunction to provide a service or perform a task. Various enclaves may require extensive communication with each other. Using shared memory can improve performance over traditional network methods. Embodiments utilize asymmetric encryption techniques to facilitate secure use of shared memory. In some embodiments, unidirectional asymmetric encryption is used. In this case, one enclave only writes the shared memory, while another enclave only reads shared memory. To facilitate this, one enclave receives a shared memory public key for writing shared memory while another enclave receives a shared memory private key for reading shared memory. In some embodiments, bidirectional asymmetric encryption is used. To facilitate this, each enclave receives a shared memory public and private keypair for reading and writing shared memory. In some embodiments, bidirectional symmetric encryption is used. In this case, a symmetric encryption key is shared with both enclaves. In many cases, symmetric encryption algorithms are faster than asymmetric encryption algorithms, enabling even better performance. Thus, disclosed embodiments improve the technical fields of virtual machine hosting, containerization, and cloud machine hosting.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for inter-enclave communication, comprising:
    receiving a shared memory request for establishing a shared memory region between a plurality of enclaves including at least a first enclave and a second enclave;
    in response to receiving the shared memory request, allocating the shared memory region;
    generating shared memory key data for the shared memory region;
    encrypting the shared memory key data with a first public key corresponding to a first private key stored in the first enclave;
    encrypting the shared memory key data with a second public key corresponding to a second private key stored in the second enclave;
    sending the shared memory key data encrypted with the first public key to the first enclave; and
    sending the shared memory key data encrypted with the second public key to the second enclave.

2. The method of claim 1, wherein generating shared memory key data comprises generating an asymmetric encryption keypair comprising a shared memory public key and a shared memory private key.

3. The method of claim 2, wherein sending shared memory key data comprises sending the shared memory public key and the shared memory private key to the first enclave and the second enclave.

4. The method of claim 2, wherein sending shared memory key data comprises sending the shared memory public key to the first enclave and sending the shared memory private key to the second enclave.

5. The method of claim 1, wherein generating shared memory key data comprises generating a symmetric encryption key.

6. The method of claim 1, wherein allocating a shared memory region comprises creating a third enclave.

7. The method of claim 1, wherein allocating a shared memory region comprises allocating a non-enclave memory region.

8. An electronic computation device comprising:
    a processor;
    a first memory coupled to the processor, the first memory comprising a first enclave and a second enclave;
    a memory cryptography coprocessor coupled to the processor;
    a second memory coupled to the memory cryptography coprocessor, the second memory containing instructions, that when executed by the memory cryptography coprocessor, perform the steps of:
        receiving a shared memory request for establishing a shared memory region between the first enclave and the second enclave;
        in response to receiving the shared memory request, allocating the shared memory region;
        generating shared memory key data for the shared memory region;
        encrypting the shared memory key data with a first public key corresponding to a first private key stored in the first enclave;
        encrypting the shared memory key data with a second public key corresponding to a second private key stored in the second enclave;
        sending the shared memory key data encrypted with the first public key to the first enclave; and
        sending the shared memory key data encrypted with the second public key to the second enclave.

9. The electronic computation device of claim 8, wherein the second memory further comprises instructions, that when executed by the memory cryptography coprocessor, perform the step of generating an asymmetric encryption keypair comprising a shared memory public key and a shared memory private key.

10. The electronic computation device of claim 9, wherein the second memory further comprises instructions, that when executed by the memory cryptography coprocessor, perform the steps of sending the shared memory public key and the shared memory private key to the first enclave and the second enclave.

11. The electronic computation device of claim 9, wherein the second memory further comprises instructions, that when executed by the memory cryptography coprocessor, perform the steps of sending the shared memory public key to the first enclave and sending the shared memory private key to the second enclave.

12. The electronic computation device of claim 8, wherein the second memory further comprises instructions, that when executed by the memory cryptography coprocessor, perform the step of generating a symmetric encryption key.

13. The electronic computation device of claim 8, wherein the second memory further comprises instructions, that when executed by the memory cryptography coprocessor, perform the step of creating a third enclave to serve as the shared memory region.

14. The electronic computation device of claim 8, wherein the second memory further comprises instructions, that when executed by the memory cryptography coprocessor, perform the step of allocating a non-enclave memory region to serve as the shared memory region.

15. A computer program product for an electronic computation device comprising a non-transitory computer readable storage medium having program instructions embodied therewith, the program instructions executable by a processor to cause the electronic computation device to:
    receive a shared memory request for establishing a shared memory region between a plurality of enclaves including at least a first enclave and a second enclave;
    in response to receiving the shared memory request, allocate the shared memory region;
    generate shared memory key data for the shared memory region;
    encrypt the shared memory key data with a first public key corresponding to a first private key stored in the first enclave;
    encrypt the shared memory key data with a second public key corresponding to a second private key stored in the second enclave;

send the shared memory key data encrypted with the first public key to the first enclave; and send the shared memory key data encrypted with the second public key to the second enclave.

16. The computer program product of claim 15, wherein the computer readable storage medium includes program instructions executable by the processor to cause the electronic computation device to generate shared memory key data comprising an asymmetric encryption keypair that includes a shared memory public key and a shared memory private key.

17. The computer program product of claim 16, wherein the computer readable storage medium includes program instructions executable by the processor to cause the electronic computation device to send the shared memory public key and the shared memory private key to the first enclave and the second enclave.

18. The computer program product of claim 16, wherein the computer readable storage medium includes program instructions executable by the processor to cause the electronic computation device to send the shared memory public key to the first enclave and send the shared memory private key to the second enclave.

19. The computer program product of claim 15, wherein the computer readable storage medium includes program instructions executable by the processor to cause the electronic computation device to generate shared memory key data comprising a symmetric encryption key.

20. The computer program product of claim 15, wherein the computer readable storage medium includes program instructions executable by the processor to cause the electronic computation device to compute a checksum for the shared memory key data.

* * * * *